Patented May 31, 1938

2,119,485

UNITED STATES PATENT OFFICE 2,119,485

CYCLOHEXENE CHLORHYDRIN

Arthur A. Levine and Oliver W. Cass, Niagara Falls, N. Y., assignors to E. I. du Pont de Nemours & Company, Wilmington, Del., a corporation of Delaware No Drawing. Application March 27, 1936, Serial No. 71,248

4 Claims. (Cl. 260—157)

This invention relates to the preparation of chlorhydrins of cyclic compounds by reacting unsaturated cyclic compounds with hypochlorous acid or its equivalent. More particularly, it relates to the preparation of cyclohexene chlorhydrin by reacting cyclohexene with hypochlorous acid or its equivalent in dilute aqueous solution at relatively low temperatures.

The preparation of cyclohexene chlorhydrin from cyclohexene has already been described in the literature. The particular invention with which this application is concerned is the preparation of cyclohexene chlorhydrin from cyclohexene which is admixed with a substantial amount of cyclohexane, without the necessity of removing said cyclohexene from the diluent cyclohexane before carrying out the reaction.

The preparation of mixtures of cyclohexene and cyclohexane is described in our co-pending application Ser. No. 71,318, filed March 27, 1936. As described in that application the product will usually consist of about 40% or less of cyclohexene, the remainder constituting cyclohexane. While these relative proportions may be regarded as illustrative of our method, the cyclohexene representing ordinarily a minor constituent of the mixture, it should be understood that our process is not restricted to the preparation of cyclohexene chlorhydrin from any particular mixture nor is it restricted to the preparation of the chlorhydrin from the reaction product as prepared in our co-pending application. It is of broad general utility wherever it is desired to prepare cyclohexene chlorhydrin from cyclohexene which is suspended or dissolved in cyclohexane, without the necessity of first separating the two constituents of the mixture.

Because cyclohexene has substantially the same boiling point as cyclohexane it is economically impossible to separate the two compounds from a mixture containing them, and under these circumstances our process, which permits the preparation of cyclohexene chlorhydrin without separating the mixture into its constituents, is a distinct advance in the art.

Accordingly it is one of the objects of this invention to prepare cyclohexene chlorhydrin suspended in cyclohexane by treatment of a mixture comprising essentially cyclohexene and cyclohexane with hypochlorous acid or its equivalent. It is still another object of this invention to prepare cyclohexene chlorhydrin by reacting cyclohexene with hypochlorous acid, or its equivalent, when the cyclohexene is admixed with or dissolved in a diluent such as cyclohexane. Moreover, another object of this invention is to isolate the chlorhydrin in substantially pure form from the cyclohexane diluent.

In carrying out our process the mixture of cyclohexene and cyclohexane is directly reacted with hypochlorous acid in aqueous solution at room temperature. Any source of hypochlorous acid may be used but hypochlorous acid prepared by the action of an acid on a hypochlorite has been found to be a convenient and suitable source. The yield of chlorhydrin is exceptionally high, as we have found that 80% or more of the cyclohexene is converted into the desired product.

We have also found that the cyclohexane present serves the very useful function of extracting the cyclohexene chlorhydrin formed from the reaction mixture and that, under these conditions, it is unnecessary to subject the aqueous portion of the reaction mixture to steam distillation or solvent extraction. This is a very important advantage of our process, for not only can the conversion of the cyclohexene to the chlorhydrin be carried out irrespective of the presence of cyclohexane, but the cyclohexane serves as an extraction solvent for the chlorhydrin. Substantially all the chlorhydrin is extracted and will be found in the cyclohexane layer constituting the oily layer of the reaction product.

As an example of our improved process for the preparation of cyclohexene chlorhydrin from cyclohexene admixed with cyclohexane the following may be given:

Example

A solution of sodium hypochlorite was prepared by reacting cold caustic solution and gaseous chlorine. By titration, the normality of this solution was found to be 2.5.

2000 cc. of the sodium hypochlorite solution were placed in a 5-liter, 3-necked flask fitted with an efficient stirrer, a thermometer and a separatory funnel. The flask was placed in an ice bath and then a mixture consisting of about 420 grams (5.0 moles) of cyclohexane and 205 grams (2.5 moles) of cyclohexene was added thereto. This mixture may be prepared as described in the example in our previously referred to co-pending application, Serial No. 71,318. The stirrer was then started and 500 cc. of cold 5 N sulfuric acid (1.25 moles) were slowly added to form the requires hypochlorous acid by reaction with the hypochlorite.

The temperature was maintained below 20° C.

at all times and 5 minutes after the addition of the last of the sulfuric acid the reaction mixture gave no positive test for the presence of hypochlorite. After the stirrer was stopped the product separated into two layers, an oily layer and an aqueous layer, the oily layer floating upon the aqueous layer.

The oily layer was removed and dried with anhydrous sodium sulfate. The weight of this layer was 730 grams and upon distillation thereof, 400 grams of cyclohexane essentially free from cyclohexene, 260 grams of cyclohexene chlorhydrin and 45 grams of a higher boiling residue were obtained. This is a 95% recovery of cyclohexane and a 77% yield of cyclohexene chlorhydrin.

When the aqueous layer was subjected to steam distillation no additional chlorhydrin resulted. This showed that practically complete extraction of the cyclohexene chlorhydrin from the reaction mixture had occurred, cyclohexane thus constituting a very satisfactory extraction solvent. The cyclohexene chlorhydrin is readily separated from the cyclohexane by fractional distillation or by extraction.

It should be remembered that the various procedures and amounts hereinbefore specified are illustrative and not to be construed as restrictive since the scope of our invention is to be determined in accordance with the appended claims.

We claim:

1. A process for preparing cyclohexene chlorhydrin from mixtures of cyclohexene and cyclohexane which comprises subjecting said mixture in liquid form to the action of hypochlorous acid.

2. A process for preparing cyclohexene chlorhydrin from mixtures of cyclohexene and cyclohexane which comprises reacting said cyclohexene in liquid form with hypochlorous acid under conditions such that the cyclohexane is not chemically changed.

3. A process for preparing cyclohexene chlorhydrin which comprises reacting a liquid mixture of cyclohexene and cyclohexane with hypochlorous acid under conditions such that the cyclohexane is not chemically attacked, and then removing said cyclohexane oily layer which contains the cyclohexene chlorhydrin dissolved therein.

4. A process for preparing cyclohexene chlorhydrin which comprises the steps of reacting a liquid mixture of cyclohexene and cyclohexane with hypochlorous acid under conditions such that the cyclohexane is not chemically attacked, removing the resulting cyclohexene chlorhydrin dissolved in cyclohexane and then recovering cyclohexene chlorhydrin in pure form by separating said mixture by fractional distillation.

ARTHUR A. LEVINE.
OLIVER W. CASS.